United States Patent [19]

Gower

[11] Patent Number: 5,751,909
[45] Date of Patent: *May 12, 1998

[54] DATABASE SYSTEM WITH METHODS FOR CONTROLLING OBJECT INTERACTION BY ESTABLISHING DATABASE CONTRACTS BETWEEN OBJECTS

[75] Inventor: Stefan F. Gower, Fremont, Calif.

[73] Assignee: Sybase, Inc., Emeryville, Calif.

[*] Notice: The term of this patent shall not extend beyond the expiration date of Pat. No. 5,535,383.

[21] Appl. No.: 676,739

[22] Filed: Jul. 8, 1996

Related U.S. Application Data

[63] Continuation of Ser. No. 214,375, Mar. 17, 1994, Pat. No. 5,535,383.

[51] Int. Cl.$^6$ ............................ G06F 15/18; G06F 17/30
[52] U.S. Cl. ................................ 395/11; 395/51; 395/614
[58] Field of Search ................................. 395/614, 11, 51

[56] References Cited

U.S. PATENT DOCUMENTS

| | | | |
|---|---|---|---|
| 5,191,613 | 3/1993 | Graziano et al. | 380/25 |
| 5,206,951 | 4/1993 | Khoyi et al. | 395/683 |
| 5,260,999 | 11/1993 | Wyman | 380/4 |
| 5,386,564 | 1/1995 | Shearer et al. | 395/612 |
| 5,504,837 | 4/1996 | Griffeth et al. | 395/11 |

OTHER PUBLICATIONS

Rosenschein J. S. et al. "Deals Among Rational Agents", Readings in Distributed Artificial Intelligence, Morgan Kaufmann Publishers, Inc. pp. 227–234, Dec. 1988.

Kakehi, R. "A Negotiation Protocol for conflict resolution in Multi–Agent Environments", Proceedings of International Conference on Intelligent and Cooperative Information Systems IEEE Comput. Soc. Press, pp. 185–196, May 1993.

Conry S. E. et al. Multistage Negotiation for distributed constraint Satisfaction, IEEE Transactions on Systems, Man and Cybernetics, vol. 21, No. 6, pp. 1426–1477, Dec. 1991.

Deen, S.M., "Inter–Agent Operations in Cooperating Knowledge Based Systems", IMS '91 Proceedings. First International Workshop on Interoperability in Multidatabase Systems, IEEE Comput. Soc. Press., pp. 230–238, Apr. 1991.

Wenger, P., "Dimensions of Object–Based Language Design," Proc. ACM OOPSLA '87, Oct. 1987, pp. 168–182.

Kim, W., "Object–Oriented Databases: Definition and Research Directions," IEEE Trans Knowledge and Data Engineering, vol. 2, No. 3, Sep. 1990, pp. 327–341.

Primary Examiner—Thomas G. Black
Assistant Examiner—Jack M. Choules
Attorney, Agent, or Firm—John A. Smart

[57] ABSTRACT

A method for ensuring reliable interactions between principals within a database or between databases. The method involves the creation of database contracts which are, in essence, binding constraints on the behavior of entities within a database system that can be enforced by the system. A database contract is formed when two or more principals agree on the terms and conditions of the contract, and a monitor puts in to place the constraints necessary to enforce the agreed-upon terms and conditions after determining that each of the principals has the requisite authority and ability to carry out the contract.

10 Claims, 1 Drawing Sheet

DATABASE SYSTEM WITH METHODS FOR CONTROLLING OBJECT INTERACTION BY ESTABLISHING DATABASE CONTRACTS BETWEEN OBJECTS

This application is a continuation application of application Ser. No. 08/214,375, filed Mar. 17, 1994, now U.S. Pat. No. 5,535,383.

FIELD OF THE INVENTION

This invention relates to the management of interactions within a computational system, in particular, to contracts between databases or within the same database.

BACKGROUND OF THE INVENTION

Within a computational system such as a database, it is desirable for participants to cooperate to accomplish certain tasks, particularly in an object-oriented database system.

In an object-oriented database system, the database is considered a collection of objects, each object representing a real world entity or concept being modeled by the database. Database objects maintain the properties or attributes of the real world objects they model. They are able to communicate by passing "messages" and to perform operations such as computations or data updates. Objects may work together within a single database or across multiple databases.

For database objects to cooperate to perform tasks, it is important that they interact properly. One possibility is to have a central point of control, or a centralized "object manager", that ensures that interacting objects do so correctly. For the most part, however, there has not been any way for a computational system to ensure that "autonomous" objects—objects in a system without a single point of control—interact in the desired manner. Since the system itself is unable to guarantee reliable object interaction, users must "trust" that object interaction will occur as planned.

Therefore many possible useful object interactions do not take place because users lack confidence that they will take place reliably. One example is a situation requiring "referential integrity." Referential integrity is required where an application program involving references to someone else's remote objects requires the continued existence of those referenced remote objects to be guaranteed. While the database administrator (DBA) attempts to maintain such objects, they still may inadvertently be deleted. As a result, developers are reluctant to develop an application for which they do not have total ownership of all required objects. Such a restriction substantially limits the range of possible application programs.

Another example of the need for reliable object interaction is software reuse. Software designers may decide to save time by using another's remote objects. When they attempt to use those objects, however, they learn that their owners have changed or deleted them.

Many object-oriented design methodologies depend upon object cooperations that, in practice, are not trusted to take place reliably. As a result, the risk associated with depending upon such interactions limits the amount of cooperation or reuse that will actually take place.

SUMMARY OF THE INVENTION

For ease of understanding, defined terms are placed in bold print. This invention provides a method of ensuring reliable coordination between autonomous "principals" in a computational system. A principal is an entity that can be authenticated and that has independent standing or "authority" in the system. Thus, a principal may represent a human user, a corporate entity or even an application program (as long as such program is recognized by the system as having the requisite authority). The method of the invention involves establishing a binding relationship, called a "database contract", between principals within the same or different databases, where two or more principals agree on the terms and conditions of the relationship, and where a monitor puts into place the constraints necessary to enforce those agreed-upon terms and conditions after determining that each of the principals has the requisite authority and ability to carry out the agreement.

Database contracts are analogous to legal contracts which allow individuals or companies to make binding agreements. The key difference is that database contracts operate within a computational system. While database contracts can be implemented in a non-database environment, the preferred embodiment of this invention uses database contracts within a database management system, preferably one which is object-oriented.

DETAILED DESCRIPTION OF A PREFERRED EMBODIMENT OF THE INVENTION

Figure 1:
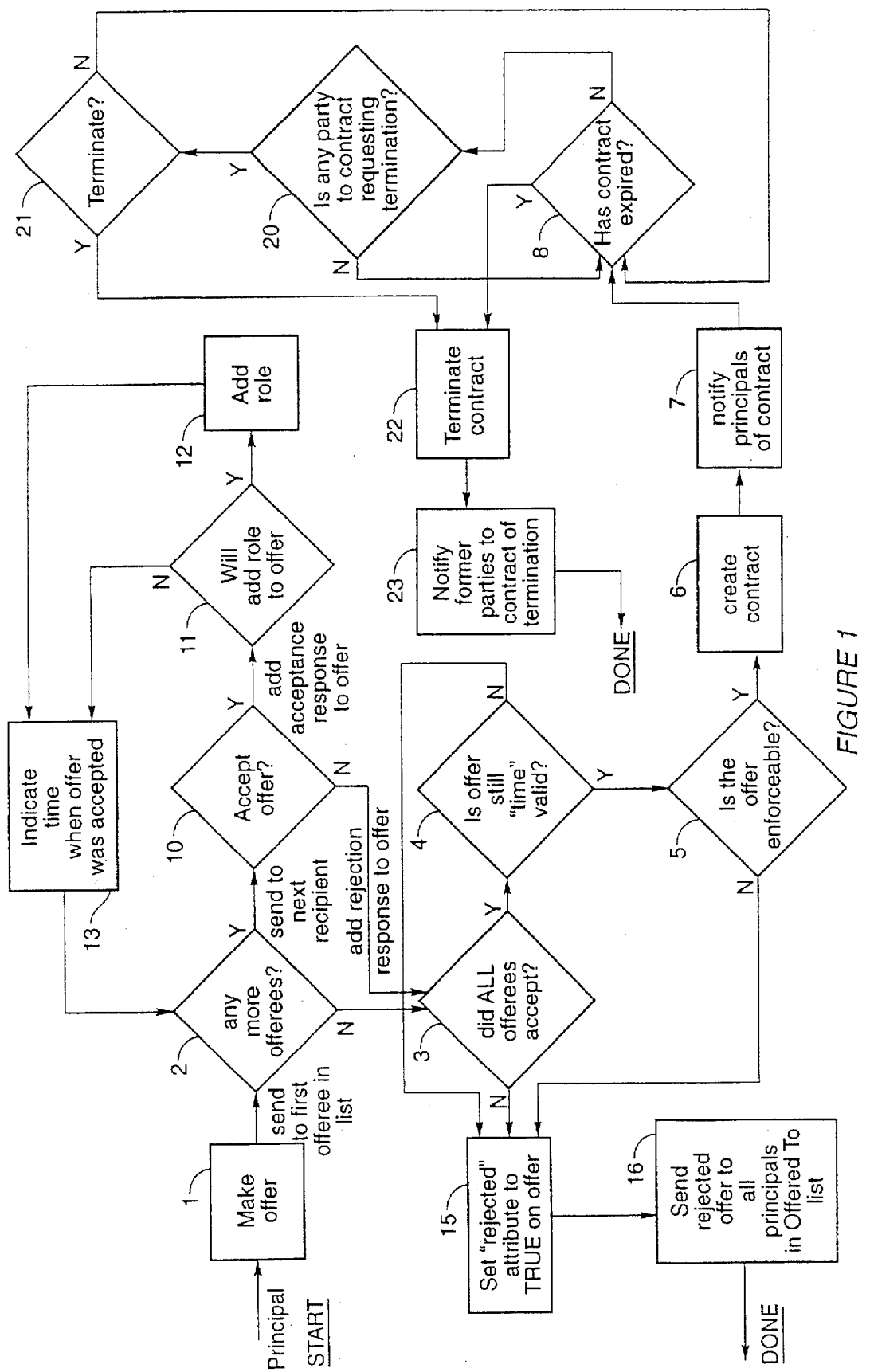
FIG. 1 is a flow chart depicting the method of the invention of establishing a binding relationship within a database system.

A database contract is used to achieve reliable coordination between autonomous principals within a computational system in a way analogous to humans using legal contracts. People enter into legal contracts to provide some assurance that the other party to a contract will perform its side of the bargain. Human contracts are effective because they rely upon a system of legal enforcement by the courts. Therefore the parties to a contract are bound to perform the duties agreed to in the contract to the extent the legal system enforces their performance.

A database contract may be used in any network of information, but the preferred embodiment uses a database. A database contract may be used with any type of data model, e.g. object-oriented, relational, hierarchical or networked, but preferably is used with an object-oriented database system. Analogous to the human system, a database contract provides reliable safeguards on object behavior to the extent the contract is enforced by the database system.

A database contract is, in essence, a set of constraints on object behavior. In general, a constraint is a binding rule that governs a particular situation within a database. For example, a constraint may require a value contained in the database to be within a certain range. If a transaction updating some data in the database attempts to cause this constraint to be violated, the transaction is aborted without making any change to the value. Alternatively, a trigger, which is a device which causes an action to take place, may be put in place which will be activated to cause some action to take place if a constraint is violated. For example, a trigger may notify someone if a particular constraint has been violated. Methods of enforcing database constraints are known in the art. See, e.g., R. Elmasri and S. Navathe, *Fundamentals of Database Systems* (1989), which is incorporated herein by reference.

A database contract is initiated when one principal makes an offer to another principal. In database terms, a principal may be considered a "principal object". The offer can be accepted, declined or ignored by the other principal (or principal object). When the offer is accepted and when the proper authority exists (to be discussed more fully below), the database management system ("DBMS") of this invention creates an enforceable contract. This is called a "database contract."

A bilateral exchange of commitments (a very common contractual occurrence) is one type of database contract. A "database procedure" of any complexity can be executed via a database contract. A database procedure is a predefined step or series of steps which the database can perform.

As shown in FIG. 1, at Step 1, a principal makes an offer and sends it to the first offeree in a list of offerees. At Step 2, a determination is made if there are no more offerees. A determination is made in Step 3 whether all offerees have accepted the offer. If they did, the results of Step 3 are passed to Step 4 for a determination of whether the offer remains "time" valid. If so, the results of Step 4 are passed to Step 5 for a determination of whether the offer is enforceable. If the answer is yes, a contract is created at Step 6. At Step 7, the principals of the contract are notified of its creation, and a determination is made at Step 8 whether or not the contract has expired.

If there was more than one offeree, the results of Step 2 are sent to the next recipient at Step 10 to accept or reject the offer. If the offer is accepted, the acceptance response to the offer is passed to Step 11 to see if any roles need to be added to the offer. If so, that role is added in Step 12. The notion of roles will be explained later. Whether or not a role is added at Step 12, the results from either Step 11 or Step 12 are passed to Step 13 for an indication of the time when the offer was accepted. That information is then passed back to Step 2, as shown.

At Step 3, if all offerees did not accept the offer, the data is transmitted to Step 15 so that the "rejected" attribute of the offer may be set to TRUE. The results are passed to Step 16 as a rejected offer, and all principals in the "OfferedTo" list are so notified.

In Step 8, if the contract has not expired, the results are passed to Step 20 to determine whether any party to the contract is requesting termination. If so, the results of Step 20 are passed to Step 21 where a decision whether or not to terminate the contract is made. If it is terminated, the results of Step 21 are passed to Step 22 where the contract is terminated and on to Step 23 where the former parties to the terminated contract are notified.

All of the above steps will be explained in more detail later. The following examples will illustrate the use of database contracts.

EXAMPLE 1

A supplier has a list of parts it supplies to a customer. The parts list also has associated prices for each part, which may change from time to time. The customer has a database of components used in its final product, many of which are purchased from that supplier, as well as from other suppliers. The customer periodically computes its final product component cost and wants to ensure that the parts costs taken from the supplier's database are up to date within certain parameters.

The understanding between the customer and the supplier is that the supplier daily will make price and availability updates to its parts database by 5:00 PM. The customer's database has a "principal object" capable of making offers. That principal object makes an offer to another principal object within the supplier's database. The supplier's principal object is capable of accepting offers. The offer itself is an "offer object". This offer object will contain the offer, which in this case requires: (1) the vendorts database to have a "periodic broadcast object"; and (2) the periodic broadcast object to be maintained on the database for six months; and (3) the customer to be included in the broadcast recipient list. A periodic broadcast object is defined as an object which, at 5:00 daily, broadcasts the most up-to-date prices of the supplier's parts to its recipient list, which here includes this customer.

The offer typically has conditions. For example, the offer may be accepted by the vendor's principal object for 24 hours. The manner of acceptance also may be specified. For example, the offer object may require that to accept this offer, the recipient must send back an "acceptance object". This acceptance object contains the identity of the accepting principal, the time of acceptance or any other desired information pertinent to acceptance.

If the offer is accepted, a "contract administrator object" (CAO) receives the acceptance object. The CAO then determines if the acceptance is valid before issuing a contract object. The CAO will check if the accepting principal object has the ability, authority and control to assure the existence of the three conditions contained in the offer, as set forth above. For example, if the accepting principal as well as another principal have the ability to turn off the periodic broadcasts, the accepting principal alone cannot guarantee compliance. The CAO has the ability to determine whether compliance can be guaranteed. Where another principal can turn off the broadcasts, thus preventing guaranteed compliance, the CAO can refuse to establish the contract object. Moreover, if another principal can delete companies from the broadcast list, the CAO again will refuse to establish the contract object. The CAO may establish the contract object if the authorizations permit another principal to add companies, but not to delete them. The CAO also will determine whether the acceptance object was received within the specified 24 hours.

If all the contractual requirements are established, the CAO creates a contract object. The contract object has a list of constraints that must be enforced. Constraints limit certain actions within the database. For such enforcement, a series of objects, one example being "trigger objects," are created. One trigger object is put on the periodic broadcast object so that it cannot be deleted from the system. Another trigger object is put on the broadcast list so that the particular customer's name cannot be deleted. The CAO also sets up a timer object which terminates the contract at the end of six months. Termination of the contract will include removal of all associated trigger objects.

EXAMPLE 2

Two autonomous systems desire referential integrity of certain objects. System X desires assurance that object "a1" exists on system Y, and system Y desires assurance that object "b2" exists on system X. A database contract between system X and system Y will prevent either party from removing the object that has been constrained to continue to exist. An application on system Y can, therefore, proceed with confidence that "b2" exists on system X, and an application on system X can proceed with confidence that "a1" exists on system Y.

EXAMPLE 3

An application is being tested at institution X on all department databases. The testing depends on the database schema (the database design or logical description) remaining unchanged in the main repository database during the testing phase. A database contract may be used to guarantee that the schema will remain fixed and that intentional or unintentional alterations cannot occur.

EXAMPLE 4

One party desires to ensure that it is notified when a particular object is changed. A constraint may be created that tests for such a notification mechanism being in place. The other party can erect the mechanism and agree to the offer. The constraint specified in the offer is checked. The change notification mechanism is detected and verified, thus satisfying the constraint. The contract is then created. Subsequently, the change notification procedure will be protected by the contract, thus eliminating the need for a party to repeatedly check for system changes.

EXAMPLE 5

A database contract can be applied to ordinary business transactions that involve bilateral exchange. For example, "digital cash" may be exchanged for certain information. "Digital cash" is electronically encoded money that can be converted to cash if the recipient has the proper encrypted signature authority. A database contract can be established to execute an arbitrary sequence of requests, which make up a database procedure, within a database transaction. Typically, no single party to the contract has sufficient individual authority in the database system (or systems) to execute this database procedure. Nor does any party wish to grant its authority to the other parties. A grant is the transfer of authority, usually from one principal to another, or from a principal to a database contract. If there is no basis of trust and the parties are mutually suspicious, each party demands to know exactly what it is going to do and what the other party or parties are going to do if the business transaction takes place. Hence the database procedure must be absolutely explicit so that each party can make an informed decision before consenting to the contract. The authority of the parties, when pooled, must be sufficient to execute this database procedure.

In this example, let us assume that one party desires to transfer digital cash to another party, who in turn will transfer oil deposit information to the first party. This is a bilateral exchange. The following actions will take place:

Action #1: Start the transaction.
Action #2: Transfer $100,000 from account of principal A to account of principal B. This requires the contract to have a grant to withdraw money from the account of principal A, and a grant to deposit money to the account of principal B.
Action #3: Transfer ownership of the oil deposit information from principal B to principal A. Similar grants are required.
Action #4: Commit the transaction.

GRANTS

Grants given to a database contract should be sufficient for the transaction to execute to completion. It is critical that most business transactions be guaranteed to be "atomic". An atomic transaction either will completely succeed or completely fail. If it fails, the state of the database remains unchanged. Such an atomicity property is typical of database transactions.

Some database transactions require two or more principals to pool their grants so that some action on the database can be taken involving mutually suspicious parties. All grants included in the contract must not only exist at the time of the contract's formation, but also must continue to exist as long as the contract exists. Hence any grant made to a grantee, that is supposed to be exclusively trapped inside the contract, must either live until the termination of the contract or the grantee itself must join the contract. The underlying conditions for the contract's successful execution must hold throughout the contract. Hence constraints on the authority system must be issued when the contract is created and retracted only when the contract ends.

Some contracts can only be made when all principals having a certain grant participate in the contract. Hence if principal P1 and principal P2 both have grant G and control of grant G is critical to the execution of the contract, then the contract must include all principals having grant G. If at time T1 when the contract is established, only principals P1 and P2 (and no other principals) have grant G, then the contract is sound in respect to access to grant G. At all later times while the contract exists, the grant authorization system must be constrained not to give out any additional grants on G unless the additional grantee(s) becomes a party to the contract. If another grantee could obtain access to grant G without becoming a party to the contract, then the contract would be unsustainable.

Database Procedures

In general, database contracts are highly valuable for allowing two or more principals to work together to execute a database procedure they could not execute separately. If execution of the database procedure is mutually advantageous for the parties, this motivates the principals to agree to a contract and to execute it.

Database procedures, executed via a database contract, will typically but not always involve a bilateral exchange. Where a bank vault may only be opened only if three designated principals provide their respective passwords, the opening of this vault does not involve any exchange. It is merely an action that can only be undertaken with the authority of the designated individuals. A database contract can implement the solution. As with any contract, notions of time are critical to database contracts that execute database procedures. The contract must clearly indicate when the contract will execute the procedure, either immediately or at some specified date and time in the future. Contracts with future executions are valuable in many financial situations. Stock and bond trading frequently involves future trades.

Modeling Database Contracts

Database contracts must be enforceable by the computational system. A contract is a promise that certain agreed upon constraints will be maintained during the lifetime of the contract. The DBMS enforces these constraints. The parties cannot violate the constraints. A voidable contract is one that may be terminated by some party. A contract administrator may be established to have authority to void a contract between autonomous principals.

An offer specifies the terms of a proposed contract. An offer accepted by another party yields a contract if the necessary authorizations exist.

An offer may be withdrawn. After the withdrawal of an offer, the offer can no longer be accepted by another party to yield a contract. In addition, an offer may be terminated as follows: (1) by being rejected by the party to whom the offer was made; (2) by the lapse of a specified time; (3) by the occurrence of a condition specified in the offer as causing termination; (4) by the "death" of a party (as will be explained later) necessary to the contract; or (5) by the offeree lacking authority to carry out the contract that would result if the offer were accepted.

Acceptance is the act of assenting to the offer. Conditions of acceptance may be the existence of those constraints that must be true for the contract to be created. In their absence, the contract is voided. As in real life, the nature and terms of offer and acceptance must be clear and unambiguous. The time by which the term of a contract is measured also must be unambiguous. The time a contract begins as well as when it terminates must be clear. Time may be specified in terms of absolute time or as a logical time interval, such as the lifetime of a database transaction. If time is specified as absolute, the "clock" by which the time is measured must be unambiguous, for example, Greenwich Mean Time.

Some person or object should have overall authority with respect to a contract. Such a person or object may be called a "monitor". The database administrator (DBA) may have that authority. Preferably, however, a role of contract administrator is established within the contract to have overall authority with respect to the contract. As will be explained in more detail below, a contract administrator obtains the authority to perform that role by having an appropriate set of grants.

Conditions under which a contract may be terminated also may be specified. It must be clear under what circumstances and by whom the contract may be terminated. For example, a contract may be terminated if all parties assent, or only one party, such as a contract administrator, has been given the power unilaterally to terminate the contract. If a contract is terminated, it may be desirable to require messages to be sent to the other parties, or to have some other action performed. For example, 24 hours notice may be given to all parties before a contract may be terminated.

Database contracts are associated with a set of pairs. A pair consists of a constraint and the database in which the constraint is enforced. Each contract is also associated with a set of roles, where a role is a set of grants. Grants are part of a database's authorization mechanism. Authorization mechanisms are known in the art. A preferred authorization mechanism is that described in R. Ahad, et al., *Supporting Access Control in an Object-Oriented Language,* Proceedings of the 3d International Conference on Extending Database Technology (1992), which is incorporated herein by reference.

Where a principal has the appropriate set of grants to perform a given operation on the database, he or she is said to be in the "role". The roles associated with a database contract are those sets of grants required to enforce all constraints that make up the contract.

An offer will typically specify the pairs, i.e., the constraints and databases on which they are enforced. When an offer is accepted, enforcement of the ensuing contract is attempted. The combination of the offering principal's roles and the accepting principal's roles are used when testing whether each constraint has sufficient grants within those respective roles for the contract to be enforced. Two autonomous principals, therefore, may collaborate to achieve a task that requires a combination of their grants. If the enforcement will be successful for each constraint, then the contract is put into effect. Unless enforcement is successful for each constraint, the contract will be voided and no constraint will be enforced.

In the offer, the offering principal may specify the grants it is giving up to the contract. The accepting principal also may specify the grants that it is giving up to the contract. The combination of these grants given up will be used to test whether sufficient grants exist to satisfy each constraint of the contract. Alternatively, the grants that each principal gives up to the contract need not be specified, and the database system can determine which of the available grants are needed to enforce the contract. If the requisite grants exist, the contract will be established.

Once a contract is in place, the parties cannot take any action that would violate the contract, such as attempting to remove a constraint. Some contracts may specify that a party may void the contract upon some specified condition, such as sending advance notification to the other parties. If no conditions for voiding a contract are specified, the contract administrator alone usually will have sole power to terminate the contract. A contract administrator may be human or may be a computational entity, such as a CAO wholly within the system.

Database contracts are most often used in the corporate environment where contracts are entered into by agents of two or more corporations. When certain requirements are met, two such agents can make contracts that are binding on their respective corporations. A corporation typically gives its respective agents authority to enter into contracts, often with restrictions as to what kinds of contracts can be entered into by a particular agent. Any kind of contract not explicitly sanctioned is implicitly prohibited. As an example, a purchasing manager normally is not allowed to bind the corporation to a strategic marketing agreement. That area of authority is not within his/her authority. Therefore it is beyond the purchasing manager's "role" in the corporation.

An agent of a corporation is restricted by what role he or she plays. This role prescribes and proscribes, respectively, what the agent can or cannot do. His or her role determines to what extent the agent can agree to and enter into contracts with agents of other companies. The ability of an agent to enter into contracts must carefully be controlled because a contract with another company binds the company as a whole. Without controls, undesirable corporate obligations may result. In an extreme situation, such undesirable obligations could seriously damage or even threaten the very existence of the company. Whenever an agent acts within its appropriate role in a corporation, any contract made by the agent binds the corporation. Otherwise it does not. Database systems such as SQL3 can provide this "role-based" authority. For the details of SQL3, see the SQL3 reference titled "ISO-ANSI Database Language Working Draft SQL (SQL3)" also identified by "X3H2-93-359R-DBL MUN-003 August, 1993", incorporated herein by reference.

A "role" can be a set of grants provided to a principal for some intended activity. For example, "a principal having the CFO role" will mean that the principal has the set of grants associated with the powers appropriate for the position of Chief Financial Officer. A "role" also implies the "state" of a principal being in the role. A role is therefore the state of a principal when that principal is actively using such a set of grants. This is called "role assumption". Role assumption is the act of assuming a role. The right to assume a role is not the same as being "in the role". Only when a principal is in the role does it have the grants associated with that role's roleset; otherwise it does not. A "roleset" is a set of grants associated with some intended activity.

A "role relinquishment" is the act of relinquishing a role. After a principal has assumed a role and before it relinquishes it, that principal is in the role. For instance, if there is an "accountant roleset" and a principal assumes this roleset, that principal is in the "accountant role".

A principal that donates a role to a contract does not relinquish his or her right to assume this role. It only means that the principal loses his or her right to violate constraints put in place by contracts that have used this role. Some authorization systems that provide rolesets allow a principal to be in multiple roles simultaneously. For the sake of simplicity of the described preferred embodiment, a principal herein only acts in one role at a time.

Personnel changes make it impractical to contract with individual agents of a corporation. Contracts are made between a principal playing a role in one corporation and a principal playing a role in another corporation. Personnel changes in the respective corporations have no effect upon these roles. Contracting by roles insulates the parties from such changes. To support such insulation, roles are separated into two classifications: "owner roles" and "non-owner roles".

The ownership property of a role determines whether it is an owner- or non-owner role. While in an owner-role, when a principal creates a new object, that object is the role itself. Similarly, if an owner is to be assigned to do something, the role will be used to do it, not the principal in the role. Such an owner-role becomes a principal.

For example, suppose a principal assumes a purchasing manager role. While in that role, any objects created by that principal belong to the purchasing manager role. Similarly, any database contract entered into while the principal is in that owner-role will indicate that the role itself, not the principal in that role, is the party to the contract. This attribution of ownership to the role and not to the principal is critical to ensuring that a particular corporate role continues regardless of personnel changes in the corporation. Contracts between corporations thus become contracts between durable owner-roles of the respective corporations.

This owner-role classification scheme does not rule out database auditing that keeps track of what actions were done by which principals. Such an audit will record both the identity of the principal owning the transaction and the current role of that principal. In this fashion, responsibility for actions in the system can still be traceable to individuals.

For practical purposes, the constraints of a contract should be such that enforcement can be done at a reasonable cost to the system. That is, even if the principals have sufficient grants to enforce each constraint, the cost may be too high for the enforcement of the contract to be reasonable. Typically, the DBA will determine what contract cost is acceptable. Alternatively, the DBA may determine a cost limit associated with each principal that may enter into a contract. To prevent contracts being created that are too costly to the system, each DBA may define an operation on Contracts that returns true (allowing contract creation) if the cost is acceptable, and returns false (preventing contract creation) if the cost is above an acceptable limit.

A request associated with a transaction may actually consist of a set of requests. The protocol described above associates roles with the contract itself. Each and every action, when attempted, can be carried out using the union of the grants made available via these roles. In some cases, the principal donating a role to a contract may wish to make this role donation specific to a certain request.

For example, if an offer is composed of requests R1, R2 and R3, a principal accepting the offer may need (in order to protect his or her interests) to target that role donation to a subset of these requests. Hence if there is a role object Role-A, that Role-A object may be associated with request R1 and none of the other requests R2 and R3.

The preferred embodiment of the invention associates roles with a contract. The roles of the contract can be used to execute the requests associated with the contract. Principals may be allowed to associate their roles with a contract only to a limited extent so that only specific requests of the contract use this role during the execution of the contract. This greater specificity allows a principal offering a role to a contract to be more selective in the contract's use of this role.

One way to simplify the use of database contracts is to establish "boilerplate contracts" for commonly occurring situations. One such standard contract is to require referential integrity. A system-provided offer, for referential integrity, would be specified so as to deal with common contractual needs between clients of objects and providers of objects. Typically, the client of an object simply wishes to specify how long he or she requires the object to exist, and requests a unilateral contract whereby the provider of the object will commit to the object's continued existence for the agreed-upon duration. Since this is a very frequent request, it behooves a database system to make the procedure for carrying out this request as simple as possible.

Motivated by this need, an offer may be provided by a system that is especially designed for this purpose. The client simply fills in the missing pieces of information, for example, the identity of the object required and the duration of time for which it is needed. In fact, the request might simply take the form of a function call, such as:

(GuaranteeExistenceofObject(Object,Duration), which returns a contract object if a contract results from the offer.

Other standard contracts may require advance notification of an upcoming database schema change, or specify what happens in the event of a computer network failure. Standard contracts may be established for most commonly occurring situations, thus obviating the need to create frequent custom contracts. A sample database contract model using the object-oriented database language OSQL is described in P. Lyngback, *OSQL: A Language for Object Databases*, HP Laboratories Technical Report HPL-DTD-91-4, January 1991, which is incorporated herein by reference.

Briefly, database objects represent entities or concepts from the real world, modeled by the database. All objects (and their data) are encapsulated by a set of functions. A function is an operation that takes members of its domain and returns a specified result that belongs to its range. Hence the function "Not" might take a member of its boolean-valued domain and return a member of its boolean-valued range. In QSQL, for example, the type of these domains and ranges can be complex, such as a set of Person objects. Users may only access objects by calling on one of the specified functions. Functions may describe attributes of objects, relationships among objects or operations on objects. Objects may also be classified by types. A type refers to a grouping of objects based on the functions that can be applied to that group of objects. Database contracts are modeled on an object type that will be called a type "contract". A type "party" represents those principals that may enter into a contract. The types "offer" and "acceptance" are also defined below.

In the following example of a preferred embodiment, the format

Function (Argument) -> Result;   /* Comment */ is used. The keywords "AS STORED" indicate a stored function, i.e. the definition defines an attribute. The argument of the function represents the object type on which the function operates. The result indicates the type of the object returned. The text within the "*/" and "*/" marks are comments.

Arguments and results can be composed of tuples or sets. The keyword set indicates a type that is a set of some other type. E.g. Set(Person) indicates a set of persons. Similarly, a tuple type is composed of other types, e.g. the function Marry might be defined as Marry(Tuple(Person,Person))->Boolean.

The various types are defined as needed. Functions of some types are not defined further because they are well known in the art. Examples include the types Principal and DateTime.

---

Create type Database;

/* A type to represent Database objects. Database objects embody the services of a database, e.g.

processing requests within a transactional environment. */

---

Create type Principal;

/* A type to represent principals recognized within an authority system that provides
access control to the data and services
of a database. */

---

Create type DateTime;

/* A datatype similar to DATETIME in the
database language SQL. Not further specified
in this document. Used to specify time-related
values related to an offer or contract. */

---

Create type Request;

/* An action to be performed,
e.g. BuyShares('Sybase',1000). */

---

Create type Constraint;

/* A constraint to be imposed on some database
or databases. */

---

Create type Offer;

/* Embodies the offer that is made to principals
and that may result in a contract. */

Create type Response;

/* The response to the Offer by the principal, and
that which must be given to the CAO handling
the processing of this Offer object. */

---

Create type Contract;

/* A contract that results from an accepted offer. */

---

Create type CAO;

/*Contract Administrator Object */

---

FUNCTIONS DEFINED ON TYPE REQUEST

---

Create function FunctionOf(Request) -> Function as stored;

/* Attribute holding a Function object. */

---

Create function ArgumentTo (Request) -> Object as stored;

/* Attribute holding an object to be used as the
argument to the function of the Request object. */

Create function Database (Request) -> Object as stored;

/* Attribute holding a Database object that determines which database the request should be processed against. */

---

Create function Evaluate (Request) -> Object;

/* The function Evaluate causes the function of the request to be applied to the argument of the request, and the result of this function application is then returned as the result.

Example. One could create a request to look up someone's social security number by name by creating a request composed of a function, such as 'LookUpSSNbyName' and a string 'Stefan Frank Gower' as the argument. An evaluation of this request would then return '564-19-1992' as its result. The type Request is important because it provides a specific action to be taken that can be analyzed statically to determine what grants are needed to perform the action. It also allows participants to request to know exactly what action will be taken and with what input arguments. */

---

FUNCTIONS DEFINED ON THE TYPE CONSTRAINT

---

Create function FunctionOf (Constraint) -> Function as stored;

/* Attribute of the function of the constraint. The actual function used must return a Boolean result. */

---

Create function ArgumentTo (Constraint) -> Object as stored;

/* Attribute of the argument of the constraint.

Note that taken together, a function f associated with a constraint, and an argument arg associated with a constraint, form an expression f(arg) returning a boolean result, i.e. true or false. The enforcement of a constraint means that evaluation of this predicate must return true. */

---

Create function Database (Constraint) -> Database as stored;

/* Attribute of the database where the constraint should be enforced. */

---

Create function Enforce (Constraint,Set(Role)) -> Boolean;

/* Creates the needed triggers to enforce the given constraint. */

---

Create function IsEnforcable (Constraint, Set(Role))-> Boolean

/* Determines if the constraint can be enforced with the set of Role objects provided. The authority of the Role objects must have the necessary privileges to ensure that the constraint can be enforced. Constraints can also be rejected if the database system cannot maintain the constraint, or can only maintain it so inefficiently that it is impractical to maintain it. I.e., the constraint would perturb all other users on a multi-user database system. Hence the constraint must be maintainable both practically and with sufficient authority. */

---

Create function Inactivate (Constraint) -> VOID

/* delete constraint and remove all associated triggers */

FUNCTIONS DEFINED ON THE TYPE OFFER

Create function Offerer (Offer) -> Principal as stored;
/* Attribute indicating principal "who" makes the offer */

Create function OfferedTo (Offer) -> List(Principal) as stored;
/* Attribute indicating the receiver (or receivers) of the offer. Each respondent to the offer will be allowed to accept or reject the offer. If the offer is accepted, the accepting principal may also add a set of grants (via a role) to the contract. The offer is made to each listed principal in the order of the list. Hence the first principal listed will receive the offer first, followed by the second, etc.
This list may include the *principal* which is actually making the offer itself. Also note that it is possible that a principal may make an offer so that this offering principal will NOT be a party to any resulting contract. Although counter-intuitive to most legalistic notions of contracts (which generally have the offerer being part of the resulting contract, if any), this protocol is more general because third-parties can initiate contracts. The typical case -- of the offerer being a participant in the resulting contract, if any -- is handled as a special case. This typical case is described below.

Typical case: When the principal creating and making the offer intends to be a party to the offer, the offerer typically lists itself as the first principal to the offer. It does so in order to receive the offer first. It then *accepts its own offer*. This is the counter-intuitive part of making an offer, but this is what enables third-parties to initiate offers and contracts while remaining outside the resulting contract, if any.

31

After this acceptance of its own offer, the remaining principals then receive the offer in their specified order.

Each recipient of the offer can determine what authority (via roles) have already been added to the offer. */

---

Create function Constraints (Offer) -> set (constraint) as stored;

/* Attribute indicating the constraints, if any, that must be enforced by the system if the contract is created. */

---

Create function Requests (Offer) -> set(Request) as stored;

/* Attribute of the set of requests associated with the contract. This can be an empty set. */

---

Create function Expiration (Offer) -> DateTime as stored;

/* Attribute of the date and time when this offer object expires and can no longer result in a contract. */

---

Create function DateAndTimeStart(Offer) -> DateTime as stored;

/* Attribute of the date and time when the contract will be enforced if the offer is accepted and results in a contract. */

Create function DateAndTimeEnd (Offer) -> DateTime as stored;

/* Attribute of the date and time when the contract will end if it is accepted. It would also be possible to state no specific end date and time. */

Create function AddResponse (Offer, Response) -> Void;

/* Adds this response to the set of Response objects associated with the Offer object. */

Create function Responses (Offer) -> Set(Response);

/* Attribute that holds the set of Response objects that have been made to the offer. */

Create function CAO (Offer) -> CAO as stored;

/* Attribute that indicates the contract administrator object that will handle the processing of this offer. */

Create function Reject (Offer) -> Void;

/* Set the value of the Rejected attribute to TRUE and then send the rejected offer to all principals in the OfferedTo list. */

Create function Rejected(Offer) -> Boolean as stored;

/* Attribute that indicates that the contract is rejected (if the value is TRUE). An offer object cannot result in a Contract object once it has been rejected. */

Create function Termination(Offer)-> Function

/* Attribute that indicates the Function object that must be called in order to terminate the contract. This termination function must be inspectable by all principals so that the principals can determine if the termination function is acceptable.

For example, the source code of the termination function may need to be available. */

Create function Roles(Offer) -> Set(Role);

/* Returns the set of Role object associated with the set of Response object in the Responses attribute. */

Create function MakeOffer (Offer) -> Void;

/* Actually causes the offer to be made.

Note that an offer cannot have values assigned
for both Requests and Constraint attributes.
An error will be generated if this occurs.

The offer is sent to each member of the list
associated with the OfferedTo function. This sending
of the offer is made in the precise order of the
list. Each principal to whom the offer is being made
can inspect the Response objects already given, if
any, and use this information in its decision to
accept or reject the offer.

Any principal sent the offer can immediately
reject the offer. If the offer is accepted,
then processing continues. If the offer is
rejected via the Reject(Offer) function, then
the offer cannot result in a contract.

If all principals respond positively, then the
offer is sent to the contract administrator object
associated with CAO attribute of the Offer object.

This last action is done via Process(CAO,Offer). */

FUNCTIONS DEFINED ON THE TYPE RESPONSE

Create function Answer (Response)-> Boolean as stored;

/* Boolean attribute that indicates whether the offer was accepted or rejected by the responding principal. */

Create function DateTimeMade (Response) -> DateTime as stored;

/* Attribute that indicates date and time when the offer was accepted or rejected. */

Create function Offer (Response) -> Offer as stored;

/* Attribute that indicates the offer being responded to. */

Create function Principal (Response) -> Principal as stored;

/* Attribute that indicates the principal responding to the offer. */

Create function Role (Response) -> Role as stored;

/* Attribute that indicates the Role object, if any,
that this respondent offers to the formation of
of the contract. It is the provision of these
Role objects to the contract that will "give" the
contract the authority it needs to enforce the
contract. */

FUNCTIONS DEFINE ON THE TYPE CAO

Create function Process(CAO,Offer) -> Void;

/* If all Response objects in the attribute
Responses are positive, continue. Otherwise,
call Reject(Offer) and exit.

If the current date and time is greater than the expiration
date and time, then Reject(Offer) and exit.

If the contract has a Constraint attribute
associated with it, call the function
DoConstraint with the Offer object.

If the offer has set of Request objects associated with it, call the function DoTransaction with the Offer object.

Exit. */

Create function DoTransaction (CAO,Offer)-> Contract

/* This function creates a Contract offer from the Offer object and then immediately executes it. */

Call MakeTransactionContract(Offer,CAO) -> Contract.

If a Contract is returned, send the returned Contract object to all the principals of the Contract.

Exit. */

Create function DoConstraint (CAO,Offer) -> Contract;

/* The following OSQL code indicates that a test is made to see if the constraint is enforceable. If it is, a call is made to create a contract. A call should be made to send messages to all involved principals if the Contract is created, as the principals will need to be aware of the Contract's creation.

if IsEnforceable(Constraint(Offer),Roles(Offer))
    then
        MakeConstraintContract(Offer,CAO);
    else
        Reject(Offer); */

---

FUNCTIONS DEFINED ON THE TYPE CONTRACT

---

Create function Offer(Contract)->Offer as stored;
    /* Attribute storing the offer Object
        from which the Contract object was made. */

---

Create function Principals(Contract)->Principals;

/* Calculates from the Offer object the set of

Principal objects associated with the Contract object. */

---

Create function CAO(Contract) -> CAO

/* Attribute holding the CAO object that administers the Contract object. */

---

Create function MakeConstraintContract(Offer,CAO) -> Contract

/* Create a Contract object and associate it with Offer and with this CAO.

Call Enforce(Constraint(Offer),Roles(Offer))

to enforce the constraints. These constraint mechanisms will stay in place until the contract is terminated.

Return the Contract object. */

---

Create function MakeTransactionContract(Offer,CAO) -> Contract

/* Create a Contract object and associate it with the offer and with this CAO. */

40

Create function Execute(Contract) -> Boolean

/* Executes the set of Request objects associated with
the Contract via its Offer object. Each Request
is executed against its respective Database object,
and the Role objects associated with the Offer object
are used to establish the prerequisite authority.
This function is executed as a transaction. Hence
if the requests are made against different databases,
a distributed transaction is involved, such as a
two-phase commit. Messages are sent to the
principals involved with the contract indicating
success or failure. After the execution of the
requests, the Contract object is terminated. */

Create function Roles(Contract)->Set(Role)

/* Returns the Roles required by the contract */

Create function Offerer (Contract) -> Principal as stored;

/* Returns Offerer attribute value of
the Contract's Offer object. */

Create function Constraints (Contract) -> set (constraint);

/* Constraints of the Contract's Offer object. */

---

Create function Requests (Contract) -> set(Request) as stored;

/* Set of Request objects from the Contract's

Offer object. */

---

Create function DateAndTimeStart(Contract) -> DateTime as stored;

/* Attribute of date and time when the contract began to be be enforced. */

---

Create function DateAndTimeEnd (Contract) -> DateTime as stored;

/* Attribute of the date and time when the contract will end if it is accepted. */

---

Create function Terminate(Contract,Principal)-> Void;

/* Terminates the Contract if the Termination function of the Offer object executes and returns TRUE. Before termination, any extant constraint is inactivated by calling Inactivate(Constraint(Offer))

first. All former parties to the contract are notified of its termination after termination takes place. */

---

42

```
Create function Roles(Offer) -> Set(Role):
    /* Returns the set of Role objects associated
       with the set of Response objects in the
       Responses attribute. */
```

It should be understood that the foregoing description is only illustrative of a preferred embodiment of the invention. As will be understood by those skilled in the art, many changes in the methods described above may be made by the skilled practitioner without departing from the spirit and scope of the invention, which should be limited only as set forth in the claims that follow.

I claim:

1. In a computer system, a computer-implemented method for controlling interaction between first and second objects, each object having authority independent of the other, the method comprising:

creating at said first object an offer providing a set of constraints dictating how said first and second objects can interact in said computer system;

communicating said offer to said second object;

determining at said second object whether to accept said set of constraints provided by said offer;

if said constraints are acceptable, determining whether said set of constraints is enforceable between said first and second objects; and if set of constraints is enforceable, establishing a binding relationship between said first and second objects, by:

storing information in said computer system information indicating that said set of constraints dictates how said first and second objects can legally interact in said computer system; and monitoring, in a manner independent of both said first and second objects, interaction between said first and second objects, for ensuring that said set of constraints is not violated.

2. The method of claim 1, wherein said monitoring step is performed by a monitor object which is independent of both said first and second objects, so that said binding relationship can be established even when said first and second objects are each mutually suspicious of one another.

3. The method of claim 2, wherein said monitor object only has authority to determine whether objects have sufficient authority to enter into binding relationships with other objects and to determine whether objects do not violate constraints of relationships which they enter into.

4. The method of claim 1, wherein said set of constraints is communicated to said second object as an offer object.

5. The method of claim 1, wherein said step of determining whether said set of constraints is enforceable comprises:

determining whether said first and second objects have sufficient authority to enter into binding a relationship with each other.

6. The method of claim 5, wherein no object in the system has authority to force another object to interact in a manner which was not first agreed upon by the other object.

7. The method of claim 5, wherein at least one of said objects has authority by virtue of delegation of authority from another object.

8. The method of claim 1, further comprising:

determining whether said first and second objects each has sufficient ability to comply with said set of constraints.

9. The method of claim 1, wherein said set of constraints includes execution of an arbitrary procedure in the system, upon occurrence of a particular event.

10. The method of claim 1, wherein said offer automatically expires if not accepted by the second object after a pre-selected time.

* * * * *